(12) United States Patent
Zakharchenko et al.

(10) Patent No.: US 11,398,058 B2
(45) Date of Patent: Jul. 26, 2022

(54) PREDICTION TYPE SIGNALING AND TEMPORAL ORDER SIGNALING IN POINT CLOUD CODING (PCC)

(71) Applicant: Huawei Technologies Co., Ltd., Shenzhen (CN)

(72) Inventors: Vladyslav Zakharchenko, Sunnyvale, CA (US); Ye-Kui Wang, San Diego, CA (US); Jianle Chen, San Diego, CA (US); Dejung Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/146,234

(22) Filed: Jan. 11, 2021

(65) Prior Publication Data
US 2021/0134018 A1    May 6, 2021

Related U.S. Application Data

(63) Continuation of application No. PCT/US2019/042258, filed on Jul. 17, 2019.
(Continued)

(51) Int. Cl.
*G06T 9/00*    (2006.01)
*H04N 19/105*    (2014.01)
(Continued)

(52) U.S. Cl.
CPC .............. *G06T 9/00* (2013.01); *H04N 19/105* (2014.11); *H04N 19/159* (2014.11);
(Continued)

(58) Field of Classification Search
CPC ...... G06T 9/00; H04N 19/105; H04N 19/159; H04N 19/172; H04N 19/184; H04N 19/70; H04N 19/593; H04N 19/503
See application file for complete search history.

(56) References Cited

U.S. PATENT DOCUMENTS 9,215,382 B1   12/2015  Hilde
2013/0142256 A1   6/2013  Wang et al.
(Continued)

FOREIGN PATENT DOCUMENTS

AU    2005203259 B2    8/2005
EP    3554083 A1 * 10/2019 ............. G01B 11/00
(Continued)

OTHER PUBLICATIONS

"Information technology—Coded Representation of Immersive Media—Part 5: Video-based Point Cloud Compression CD Stage," ISO/IEC 23090-5:2018(3), ISO/IEC JTC 1/SC 29/WG 11, May 8, 2019, 142 pages.
(Continued)

*Primary Examiner* — Richard A Hansell, Jr.
(74) *Attorney, Agent, or Firm* — Conley Rose, P.C.

(57) ABSTRACT

An apparatus comprises an encoder configured to obtain point clouds, generate a first field that implements prediction type signaling of the point clouds, generate a second field that implements temporal order signaling of the point clouds, and encode the first field and the second field into an encoded bitstream; and an output interface coupled to the encoder and configured to transmit the encoded bitstream. An apparatus comprises a receiver configured to receive an encoded bitstream; and a processor coupled to the encoded bitstream and configured to decode the encoded bitstream to obtain a first field and second field, wherein the first field implements prediction type signaling of point clouds, and wherein the second field implements temporal order signaling of the point clouds, and generate the point clouds based on the first field and the second field.

27 Claims, 9 Drawing Sheets

Related U.S. Application Data (60) Provisional application No. 62/699,141, filed on Jul. 17, 2018.

(51) Int. Cl.
*H04N 19/159* (2014.01)
*H04N 19/172* (2014.01)
*H04N 19/184* (2014.01)
*H04N 19/70* (2014.01)

(52) U.S. Cl.
CPC ......... *H04N 19/172* (2014.11); *H04N 19/184* (2014.11); *H04N 19/70* (2014.11)

(56) References Cited

U.S. PATENT DOCUMENTS

| | | | | |
|---|---|---|---|---|
| 2014/0211849 | A1* | 7/2014 | Deshpande | H04N 19/65 375/240.12 |
| 2017/0155918 | A1* | 6/2017 | Lin | H04N 19/156 |
| 2019/0116357 | A1* | 4/2019 | Tian | H04N 19/14 |
| 2019/0180459 | A1* | 6/2019 | Shi | G06T 7/521 |
| 2019/0257949 | A1* | 8/2019 | Bravo Orellana | G01S 17/58 |
| 2020/0013235 | A1* | 1/2020 | Tsai | G06T 7/73 |
| 2020/0021847 | A1* | 1/2020 | Kim | H04N 19/17 |

FOREIGN PATENT DOCUMENTS

| | | | | |
|---|---|---|---|---|
| EP | 3595181 | A1 * | 1/2020 | ............ H03M 7/30 |
| EP | 3324210 | B1 * | 7/2020 | ............ G01S 13/60 |
| JP | 2015188333 | A | 11/2015 | |
| KR | 10-2005-0039750 | | 4/2005 | |

OTHER PUBLICATIONS

"Information technology—Coded Representation of Immersive Media—Part 5: Visual Volumetric Video-based Coding (V3C) and Video-based Point Cloud Compression (V-PCC), FDIS Stage", ISO/IEC JTC 1/SC 29/WG 11, Sep. 21, 2020, 353 pages.

Subramanyam, "Inter frame compression for 3D dynamic point clouds," TU Delft; Multimedia Computing Group; Publication [online]. Oct. 27, 2017 [retrieved Sep. 19, 2019]. Retrieved from the Internet: <URL: https://repository.tudelft.nl/islandora/object/uuid%3A32148d56-ebf3-4766-b363-85a7d236fd48>; pp. 1-68.

Lukasz Litwic (Ericsson) ,"On bitstream syntax for PCC", International Organisation for Standardisation Organisation Internationale De Normalisation ISO/IEC JTC1/SC29/WG11, Coding of Moving Pictures and Audio ISO/IEC JTC1/SC29/WGII MPEG2018/M43711 , Jul. 12, 2018, Ljubljana, Slovenia, total 8 pages.

Ohji Nakagami et al,"Second Working Draft for PCC Categories 1,3", International Organization for Standardization Organisation Internationale De Normalisation ISO/IEC JTC 1/SC 29/WG 11 , Coding of Moving Pictures and Audio, SO/IEC JTC1/SC29/WGU MPEG 2018/N17533 , Apr. 2018, San Diego, US, total 46 pages.

Lukasz Litwic (Ericsson),"On bitstream syntax for PCC", International Organisation for Standardisation Organisation Internationale De Normalisation ISO/IEC JTC1/SC29/WG11, Coding of Moving Pictures and Audio ISO/IEC JTC1/SC29/WGII MPEG2018/M43711,Jul. 18, 2018, Ljubljana, Slovenia, total 8 pages.

* cited by examiner

| group_of_frames_header( ) { | DESCRIPTOR |
|---|---|
| group_of_frames_size | u(8) |
| max_frame_order_cnt | u(v) |
| frame_width | u(16) |
| frame_height | u(16) |
| occupancy_resolution | u(8) |
| radius_to_smoothing | u(8) |
| neighbor_count_smoothing | u(8) |
| radius2_boundary_detection | u(8) |
| threshold_smoothing | u(8) |
| lossless_geometry | u(8) |
| lossless_texture | u(8) |
| no_attributes | u(8) |
| lossless_geometry_444 | u(8) |
| absolute_d1_coding | u(8) |
| binary_arithmetic_coding | u(8) |
| poc_lookup_encoder[] | u(8) |
| ByteCount += 16 | |
| } | |

| group_of_frames_auxiliary_information( ) { | DESCRIPTOR |
|---|---|
| for ( i = 0; i < max_frame_order_cnt; i++) { | |
| frame_order_count | ue(v) |
| frame_type | ue(v) |
| if ( frame_type ! = 0) { // intra frame | |
| ref_idx | u(v) |
| } | |
| frame_auxiliary_information( ) | |
| } | |
| } | |

| patch_sequence_parameter_set( ) { | DESCRIPTOR |
|---|---|
| psps_patch_sequence_parameter_set_id | ue(v) |
| psps_log2_patch_packing_block_size | u(3) |
| psps_log2_max_patch_frame_order_cnt_lsb_minus4 | ue(v) |
| psps_max_dec_patch_frame_buffering_minus1 | ue(v) |
| psps_long_term_ref_patch_frames_flag | u(1) |
| psps_num_ref_patch_frame_lists_in_psps | ue(v) |
| for (j = 0; j < psps_num_ref_patch_frame_lists_in_psps; j++) | |
| ref_list_struct(j) | |
| psps_use_eight_orientations_flag | u(1) |
| if ( sps_45degree_projection_patch_enabled_flag) | |
| psps_45degree_projection_patch_present_flag | u(1) |
| psps_normal_axis_limits_quantization_enable_flag | u(1) |
| psps_normal_axis_max_delta_value_enable_flag | u(1) |
| byte_alignment( ) | |
| } | |

| frame_auxiliary_information( ) { | DESCRIPTOR |
|---|---|
| patch_count | u(32) |
| occupancy_precision | u(8) |
| max_candidate_Count | u(8) |
| bit_count_u0 | u(8) |
| bit_count_v0 | u(8) |
| bit_count_u1 | u(8) |
| bit_count_v1 | u(8) |
| bit_count_d1 | u(8) |
| occupancy_aux_stream_size | u(32) |
| ByteCount += 15 | |
|     if ( frame_idx > 0 && delta_occupancy_coding) { | |
|     max_from_unmatched_patch_flag | u(1) |
|     if ( max_from_unmatched_patch_flag) { | |
|     maximum_item_indication | u(5) |
|       for (i = 0; i < 5; i++) { | |
|       if ( maximum_item_indication[i]) { | |
|         bit_count_unmatched_patch_item[i] | u(8) |
|       } | |
|     } | |
| } | |
| matched_patch_count | ae(v) |
|     for (i = 0; i < matched_patch_count; i++) { | |
|     patchList[i].delta_patch_idx | se(v) |
|     patchList[i].delta_patch_u0 | se(v) |
|     patchList[i].delta_patch_v0 | se(v) |
|     patchList[i].delta_patch_u1 | se(v) |
|     patchList[i].delta_patch_v1 | se(v) |
|     patchList[i].delta_patch_d1 | se(v) |
|     patchList[i].delta_size_u0 | se(v) |
|     patchList[i].delta_size_v0 | se(v) |
| } | |

FIG. 6A

| | |
|---|---|
| for (i = matched_patch_count; i < patch_count; i++) { | |
| patchList[i].patch_u0 | ae(v) |
| patchList[i].patch_v0 | ae(v) |
| patchList[i].patch_u1 | ae(v) |
| patchList[i].patch_v1 | ae(v) |
| patchList[i].patch_d1 | ae(v) |
| patchList[i].delta_size_u0 | se(v) |
| patchList[i].delta_size_v0 | se(v) |
| patchList[i].normal_axis | ae(v) |
| } | |
| } else { | |
| for (i = 0; i < patchCount; i++) { | |
| patchList[i].patch_u0 | ae(v) |
| patchList[i].patch_v0 | ae(v) |
| patchList[i].patch_u1 | ae(v) |
| patchList[i].patch_v1 | ae(v) |
| patchList[i].patch_d1 | ae(v) |
| patchList[i].delta_size_u0 | se(v) |
| patchList[i].delta_size_v0 | se(v) |
| patchList[i].normal_axis | ae(v) |
| } | |
| } | |
| ... | |

| patch_tile_group_header( ) { | DESCRIPTOR |
|---|---|
|     ptgh_patch_frame_parameter_set_id | ue(v) |
|     ptgh_address | u(v) |
|     ptgh_type | ue(v) |
|     ptgh_patch_frm_order_cnt_lsb | u(v) |
|     if ( psps_num_ref_patch_frame_lists_in_psps > 0) | |
|         ptgh_ref_patch_frame_list_sps_flag | u(1) |
|     if ( ptgh_ref_patch_frame_lists_sps_flag) | |
|         if ( psps_num_ref_patch_frame_lists_in_psps > 1) | |
|             ptgh_ref_patch_frame_list_idx | u(v) |
|     else | |
|         ref_list_struct ( psps_num_ref_patch_frame_lists_in_psps) | |
|     for (j = 0; j < NumLtrPatchFrmEntries; j++) { | |
|         ptgh_additional_pfoc_lsb_present_flag[j] | u(1) |
|         if ( ptgh_additional_pfoc_lsb_present_flag[j]) | |
|             ptgh_additional_pfoc_lsb_val[j] | u(v) |
|     } | |
|     if ( psps_normal_axis_limits_quantization_enable_flag) { | |
|         ptgh_normal_axis_min_value_quantizer | u(5) |
|         if ( psps_normal_axis_max_delta_value_enable_flag) | |
|             ptgh_normal_axis_max_delta_value_quantizer | u(5) |
|     } | |

FIG. 9A

| | |
|---|---|
| if ( ptgh_type == P && num_ref_entries[RlsIdx] > 1 ) { | |
|     ptgh_num_ref_idx_active_override_flag | u(1) |
|     if ( ptgh_num_ref_idx_active_override_flag) | |
|         ptgh_num_ref_idk_active_minus1 | ue(v) |
| } | |
| if ( ptgh_type == I ) { | |
|     ptgh_2d_shift_u_bit_count_minus1 | u(8) |
|     ptgh_2d_shift_v_bit_count_minus1 | u(8) |
|     ptgh_3d_shift_tangent_axis_bit_count_minus1 | u(8) |
|     ptgh_3d_shift_bitangent_axis_bit_count_minus1 | u(8) |
|     ptgh_lod_bit_count_ | u(8) |
| } else { | |
|     ptgh_inter_predict_bit_count_flag | u(1) |
|     if ( ptgh_inter_predict_bit_count_flag) { | |
|         ptgh_inter_predict_2d_shift_u_bit_count_flag | u(1) |
|         if ( !ptgh_inter_predict_2d_shift_u_bit_count_flag) | |
|             ptgh_2d_shift_u_bit_count_minus1 | u(8) |
|         ptgh_inter_predict_2d_shift_v_bit_count_flag | u(1) |
|         if ( !ptgh_inter_predict_2d_shift_v_bit_count_flag) | |
|             ptgh_2d_shift_v_bit_count_minus1 | u(8) |
|         ptgh_inter_predict_3d_shift_tangent_axis_bit_count_flag | u(1) |
|         if ( !ptgh_inter_predict_3d_shift_tangent_axis_bit_count_flag) | |
|             ptgh_3d_shift_tangent_axis_bit_count_minus1 | u(8) |
|         ptgh_inter_predict_3d_shift_bitangent_axis_bit_count_flag | u(1) |
|         if ( !ptgh_inter_predict_3d_shift_bitangent_axis_bit_count_flag) | |
|             ptgh_3d_shift_bitangent_axis_bit_count_minus1 | u(8) |
|         ptgh_inter_predict_lod_bit_count_flag | u(1) |
|         if ( !ptgh_inter_predict_lod_bit_count_flag) | |
|             ptgh_lod_bit_count | u(8) |
|     } | |
| } | |
| if ( sps_pcm_patch_enabled_flag) { | |
|     ptgh_pcm_3d_shift_bit_count_flag | u(1) |
|     if ( ptgh_pcm_3d_shift_bit_count_flag) | |
|         ptgh_pcm_3d_shift_axis_bit_count_minus1 | u(v) |
| } | |
| byte_alignment( ) | |
| } | |

PREDICTION TYPE SIGNALING AND TEMPORAL ORDER SIGNALING IN POINT CLOUD CODING (PCC)

CROSS-REFERENCE TO RELATED APPLICATIONS

This is a continuation of Int'l Patent App. No. PCT/US2019/042258 filed on Jul. 17, 2019, which claims priority to U.S. Prov. Patent App. No. 62/699,141 filed on Jul. 17, 2018, both of which are incorporated by reference.

TECHNICAL FIELD

The disclosed embodiments relate to PCC in general and prediction type signaling and temporal order signaling in PCC in particular.

BACKGROUND

Point clouds use a relatively large amount of data, so communication of point clouds uses a relatively large amount of bandwidth. However, many networks operate at or near their bandwidth capacities. In addition, customers demand high point cloud quality, which requires using even more data. There is therefore a desire to both reduce the amount of data point clouds use and improve point cloud quality. One solution is to compress point clouds during an encoding process and decompress the point clouds during a decoding process.

SUMMARY

A first aspect relates to an apparatus comprising: an encoder configured to: obtain point clouds, generate a first field that implements prediction type signaling of the point clouds, generate a second field that implements temporal order signaling of the point clouds, and encode the first field and the second field into an encoded bitstream; and an output interface coupled to the encoder and configured to transmit the encoded bitstream.

In a first implementation form of the apparatus according to the first aspect as such, the first field is a frame type field that indicates that values for all frames of coded point clouds in an access unit are members of a set listed for a given value of the frame type field.

In a second implement form of the apparatus according to the first aspect as such or any preceding implementation form of the first aspect, the point clouds comprise a first point cloud, wherein the point clouds are in an associated GOF) wherein the second field comprises an FOC field and a maximum FOC field, wherein the FOC field uniquely identifies the first point cloud from among the point clouds in the GOF, and wherein the maximum FOC field specifies an endpoint of a range of the FOC field.

In a third implement form of the apparatus according to the first aspect as such or any preceding implementation form of the first aspect, the second field comprises a POC lookup encoder field that specifies a list of values used to define a temporal consistency between frames.

In a fourth implement form of the apparatus according to the first aspect as such or any preceding implementation form of the first aspect, the second field comprises a reference index field that specifies a reference point cloud index for a current prediction unit.

A second aspect relates to a method comprising: obtaining point clouds; generating a first field that implements prediction type signaling of the point clouds; generating a second field that implements temporal order signaling of the point clouds; encoding the first field and the second field into an encoded bitstream; and transmitting the encoded bitstream.

In a first implementation form of the method according to the second aspect as such, the first field is a frame type field that indicates that values for all frames of coded point clouds in an access unit are members of a set listed for a given value of the frame type field.

In a second implementation form of the method according to the second aspect as such or any preceding implementation form of the second aspect, the point clouds comprise a first point cloud, wherein the point clouds are in an associated GOF, wherein the second field comprises an FOC field and a maximum FOC field, wherein the FOC field uniquely identifies the first point cloud from among the point clouds in the GOF, and wherein the maximum FOC field specifies an endpoint of a range of the FOC field.

In a third implementation form of the method according to the second aspect as such or any preceding implementation form of the second aspect, the second field comprises a POC lookup encoder field that specifies a list of values used to define a temporal consistency between frames.

In a fourth implementation form of the method according to the second aspect as such or any preceding implementation form of the second aspect, the second field comprises a reference index field that specifies a reference point cloud index for a current prediction unit.

A third aspect relates to an apparatus comprising: a receiver configured to receive an encoded bitstream; and a processor coupled to the encoded bitstream and configured to: decode the encoded bitstream to obtain a first field and second field, wherein the first field implements prediction type signaling of point clouds, and wherein the second field implements temporal order signaling of the point clouds, and generate the point clouds based on the first field and the second field.

In a first implementation form of the apparatus according to the third aspect as such, the first field is a frame type field that indicates that values for all frames of coded point clouds in an access unit are members of a set listed for a given value of the frame type field.

In a second implementation form of the apparatus according to the third aspect as such or any preceding implementation form of the third aspect, the point clouds comprise a first point cloud, wherein the point clouds are in an associated GOF, wherein the second field comprises an FOC field and a maximum FOC field, wherein the FOC field uniquely identifies the first point cloud from among the point clouds in the GOF, and wherein the maximum FOC field specifies an endpoint of a range of the FOC field.

In a third implementation form of the apparatus according to the third aspect as such or any preceding implementation form of the third aspect, the second field comprises a POC lookup encoder field that specifies a list of values used to define a temporal consistency between frames.

In a fourth implementation form of the apparatus according to the third aspect as such or any preceding implementation form of the third aspect, the second field comprises a reference index field that specifies a reference point cloud index for a current prediction unit.

A fourth aspect relates to a method comprising: receiving an encoded bitstream; decoding the encoded bitstream to obtain a first field and second field, wherein the first field implements prediction type signaling of point clouds, and wherein the second field implements temporal order signaling of the point clouds; and generating the point clouds based on the first field and the second field.

In a first implementation form of the method according to the fourth aspect as such, the first field is a frame type field that indicates that values for all frames of coded point clouds in an access unit are members of a set listed for a given value of the frame type field.

In a second implementation form of the method according to the fourth aspect as such or any preceding implementation form of the fourth aspect, the point clouds comprise a first point cloud, wherein the point clouds are in an associated GOF, wherein the second field comprises an FOC field and a maximum FOC field, wherein the FOC field uniquely identifies the first point cloud from among the point clouds in the GOF, and wherein the maximum FOC field specifies an endpoint of a range of the FOC field.

In a third implementation form of the method according to the fourth aspect as such or any preceding implementation form of the fourth aspect, the second field comprises a POC lookup encoder field that specifies a list of values used to define a temporal consistency between frames.

In a fourth implementation form of the method according to the fourth aspect as such or any preceding implementation form of the fourth aspect, the second field comprises a reference index field specifies a reference point cloud index for a current prediction unit.

A fifth aspect relates to an apparatus comprising: an encoding means configured to: obtain point clouds, generate a first field that implements prediction type signaling of the point clouds, generate a second field that implements temporal order signaling of the point clouds, and encode the first field and the second field into an encoded bitstream; and an transmission means coupled to the encoding means and configured to transmit the encoded bitstream.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:
ASIC: application-specific integrated circuit
AU: access unit
B: bidirectional prediction mode
CPU: central processing unit
DSP: digital signal processor
EO: electrical-to-optical
FOC: frame order count
FPGA: field-programmable gate array
GOF: group of frames
I: intra-prediction mode
ISO/IEC: International Organization for Standardization/International Electrotechnical Commission
LSB: least significant bit
OE: optical-to-electrical
P: unidirectional prediction mode
PCC: point cloud coding
POC: point cloud order count
PSPS: patch SPS
PTG: patch tile group
PTGH: PTG header
RAM: random-access memory
RF: radio frequency
ROM: read-only memory
RX: receiver unit
SPS: sequence parameter set
SRAM: static RAM
TCAM: ternary content-addressable memory
TX: transmitter unit.

Figure 1:
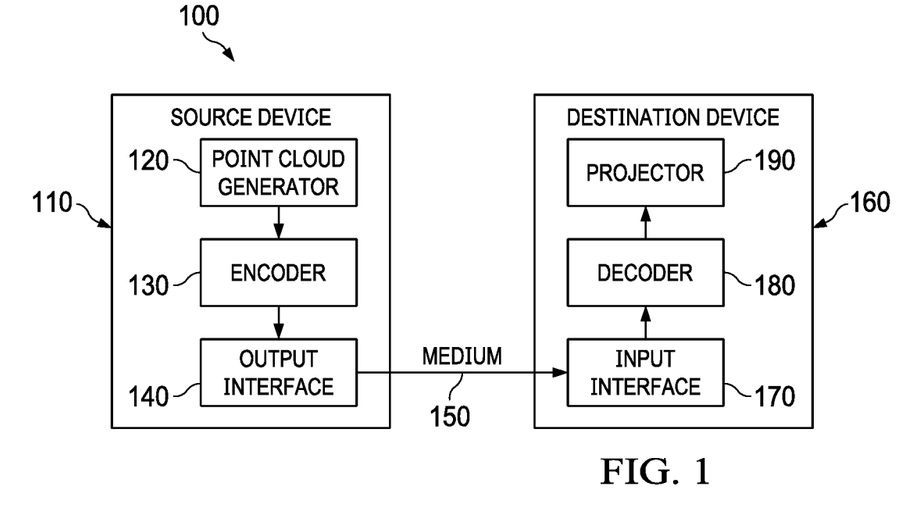
FIG. 1 is a schematic diagram of a coding system.

FIG. 1 is a schematic diagram of a coding system 100. The coding system 100 comprises a source device 110, a medium 150, and a destination device 160.

The source device 110 comprises a point cloud generator 120, an encoder 130, and an output interface 140. The point cloud generator 120 is a component suitable for generating point clouds. The encoder 130 may be referred to as a codec. The encoder 130 performs encoding according to a set of rules. The output interface 140 is an antenna or another component suitable for transmitting data to the destination device 160. Alternatively, the point cloud generator 120, the encoder 130, and the output interface 140 are in a combination of devices.

The medium 150 is a local network, a radio network, the Internet, or another suitable medium. The medium 150 communicates data between the source device 110 and the destination device 160.

The destination device 160 comprises an input interface 170, a decoder 180, and a projector 190. The input interface 170 is an antenna or another component suitable for receiving data from the source device 110. The decoder 180 may also be referred to as a codec. The decoder 180 performs decoding according to a set of rules. The projector 190 is a component suitable for projecting point clouds. Alternatively, the input interface 170, the decoder 180, and the projector 190 are in a combination of devices.

In operation, in the source device 110, the point cloud generator 120 captures a point cloud, the encoder 130 encodes the point cloud to create an encoded point cloud, and the output interface 140 transmits the encoded point cloud over the medium 150 and towards the destination device 160. The source device 110 may locally store the point cloud or the encoded point cloud, or the source device 110 may instruct storage of the point cloud or the encoded point cloud on another device. In the destination device 160, the input interface 170 receives the encoded point cloud from the source device 110, the decoder 180 decodes the encoded point cloud to obtain a decoded point cloud, and the projector 190 projects the decoded point cloud. The decoder 180 may decode the encoded point cloud in a reverse manner compared to how the encoder 130 encodes the point cloud. The destination device 160 locally stores the encoded point cloud or the decoded point cloud, or the destination device 160 instructs storage of the encoded point cloud or the decoded point cloud on another device.

Current PCC does not define a prediction type, for instance intra-prediction or inter-prediction. For PCC, intra-prediction relies on spatial prediction to reduce or remove spatial redundancy within a single point cloud, and inter-prediction relies on temporal prediction to reduce or remove temporal redundancy among adjacent point clouds. Unidirectional prediction is a type of inter-prediction that uses only a previous point cloud to code a current point cloud. Bidirectional prediction is a type of inter-prediction that uses a previous point cloud, a subsequent point cloud, or both the previous point cloud and the subsequent point cloud to code a current point cloud. I may indicate an intra-prediction mode for using intra-prediction, P may represent a unidirectional prediction mode for using unidirectional prediction, and B may represent a bidirectional prediction mode for using bidirectional prediction. There is therefore a need for PCC to define prediction types.

In addition, current PCC assumes that point clouds or their associated AUs are coded in the same temporal order that the point cloud generator 120 generates the point clouds. However, the encoder 130 may encode point clouds and their associated AUs in a temporal order different from how the point cloud generator 120 generates the point clouds. There is therefore a need for PCC to define temporal orders of point clouds and their associated AUs.

Disclosed herein are embodiments for prediction type signaling and temporal order signaling in PCC. The prediction type signaling defines whether intra-prediction, unidirectional prediction, or bidirectional is used to code point clouds. The temporal order signaling defines what temporal order point clouds are generated in and therefore should be projected in. Various fields signaled in bitstreams and defined in syntax implement the prediction type signaling and the temporal order signaling. In an embodiment, a frame type field implements the prediction type signaling, and maximum FOC fields, a POC lookup encoder field, an FOC field, and a reference index field implement the temporal order signaling. In another embodiment, a PTGH type field implements the prediction type signaling, and a maximum patch FOC LSB field, a PTGH patch FOC LSB field, a PTGH frame list SPS flag field, and a PTGH reference patch frame list index field implement the temporal order signaling.

Figure 2:
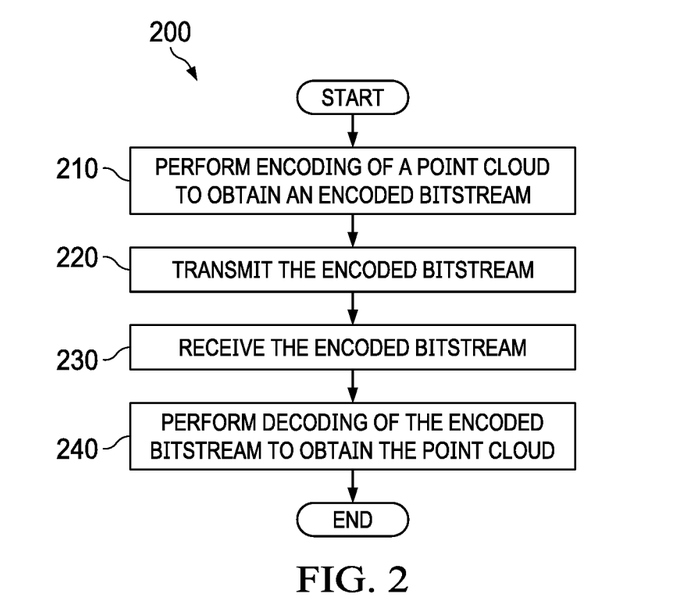
FIG. 2 is a flowchart illustrating a simplified coding method.

FIG. 2 is a flowchart illustrating a simplified coding method 200. The coding system 100 implements the method 200. The simplified coding method 200 demonstrates part of a PCC process. Thus, the coding process may comprise other steps.

At step 210, the encoder 130 performs encoding of a point cloud to obtain an encoded bitstream. At step 220, the output interface 140 transmits the encoded bitstream. At step 230, the input interface 170 receives the encoded bitstream. At step 240, the decoder 180 performs decoding of the encoded bitstream to obtain the point cloud. Step 240 is further described with respect to FIG. 6B below.

Figure 3:
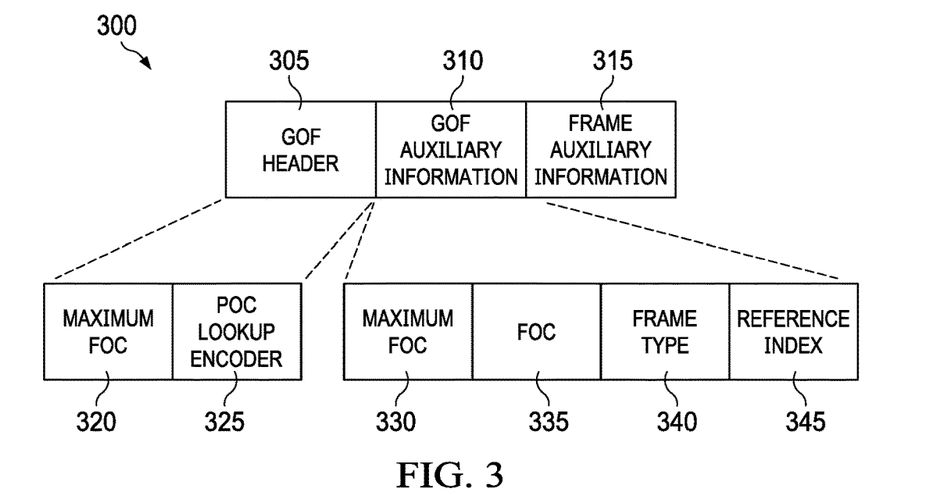
FIG. 3 is a schematic diagram of a simplified encoded bitstream according to an embodiment of the disclosure.

FIG. 3 is a schematic diagram of a simplified encoded bitstream 300 according to an embodiment of the disclosure. The simplified encoded bitstream 300 may be the encoded bitstream in FIG. 2. The simplified encoded bitstream 300 demonstrates part of an encoded bitstream for PCC. Thus, the simplified encoded bitstream 300 may comprise other fields not shown, or the fields may be in a different arrangement. Fields may also be referred to as elements or syntax elements. The simplified encoded bitstream 300 comprises a GOF header field 305, a GOF auxiliary information field 310, and a frame auxiliary information field 315.

The GOF header field 305 may be represented as group_of_frames_header. The GOF header field 305 comprises a maximum FOC field 320 and a POC lookup encoder field 325. The maximum FOC field 320 may be represented as max_frame_order_cnt. The maximum FOC field 320 specifies an endpoint of a range of an FOC field. The POC lookup encoder field 325 may be represented as poc_lookup_encoder. The POC lookup encoder field 325 specifies a list of values used to define a temporal consistency between frames. Though the POC lookup encoder field 325 is shown in the GOF header field 305, the POC lookup encoder field 325 may be signaled at a sequence level, or the POC lookup encoder field 325 may be not be signaled, but may instead be in the codec. The decoder 180 may ignore the POC lookup encoder field 325.

Figure 4:
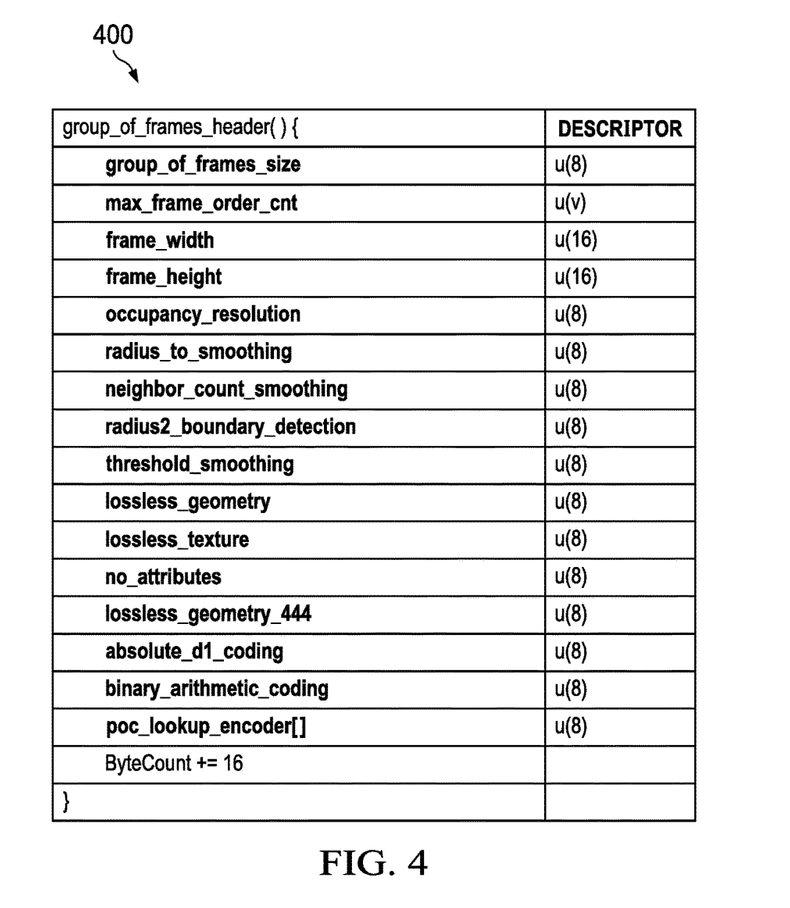
FIG. 4 is syntax for the GOF header field in FIG. 3 according to an embodiment of the disclosure.

FIG. 4 is syntax 400 for the GOF header field 305 in FIG. 3 according to an embodiment of the disclosure. The encoder 130 and the decoder 180 may store the syntax 400. The encoder 130 implements the syntax 400 in step 210 of FIG. 2, and the decoder 180 implements the syntax 400 in step 240 of FIG. 2. The syntax 400 shows that the GOF header field 305, represented as group_of_frames_header, comprises the maximum FOC field 320, represented as max_frame_order_cnt, and the POC lookup encoder field 325, represented as poc_lookup_encoder.

Returning to FIG. 3, the GOF auxiliary information field 310 may be represented as group_of_frames_auxiliary_information. The GOF auxiliary information field 310 comprises a maximum FOC field 330, an FOC field 335, a frame type field 340, and a reference index field 345. The maximum FOC field 330 is described above. The FOC field 335 may be represented as frame_order_cnt. The FOC field 335 uniquely identifies a point cloud from among all point clouds in an associated GOF, bitstream, or other set of data. When a buffer of the decoder 180 outputs a point cloud, the FOC field 335 indicates the temporal position of the point cloud relative to other point clouds. A length of the frame_order_cnt syntax element may be defined by a GOF size, and a value of frame_order_cnt may be reset for each GOF. The value of frame_order_cnt shall be in the range of 0 to (maxframe_order_cnt−1), inclusive. When frame_order_cnt is not present, then slice_pic_order_cnt_lsb is inferred to be equal to 0. The frame type field 340 may be represented as frame type. The frame type field 340 indicates that values for all frames of coded point clouds in an access unit are members of a set listed in Table 1 for a given value of frame_type. The value of frame type shall be equal to 0, 1, or 2 in bitstreams conforming to a PCC specification.

TABLE 1

Values for Frame Type Field 340

| frame_type | Value |
|---|---|
| 0 | I |
| 1 | P, I |
| 2 | B, P, I |

As shown, when frame type has a value of 0, an intra-prediction mode denoted by I is used; when frame type has a value of 1, a unidirectional prediction mode denoted by P is also used; and when frame type has a value of 2, a bidirectional prediction mode denoted by B is also used. The reference index field 345 may be represented as ref_idx. The reference index field 345 specifies a reference point cloud index for a current prediction unit. The reference index field 345 may be different for metadata and video components of a bitstream.

Figure 5:
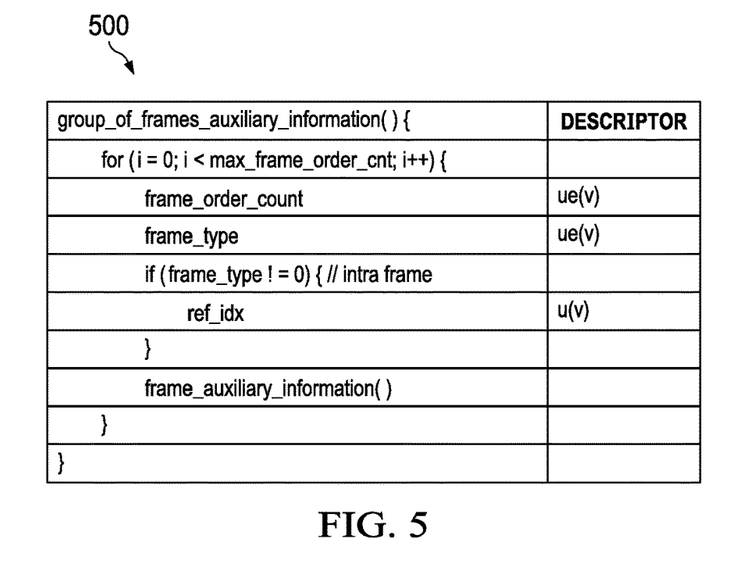
FIG. 5 is syntax for the GOF auxiliary information field in FIG. 3 according to an embodiment of the disclosure.

FIG. 5 is syntax 500 for the GOF auxiliary information field 310 in FIG. 3 according to an embodiment of the disclosure. The encoder 130 and the decoder 180 may store the syntax 500. The encoder 130 implements the syntax 500 in step 210 of FIG. 2, and the decoder 180 implements the syntax 500 in step 240 of FIG. 2. The syntax 500 shows that the GOF auxiliary information field 310, represented as group_of_frames_auxiliary_information, comprises the maximum FOC field 330, represented as max_frame_order_cnt; the FOC field 335, represented as frame_order_count; the frame type field 340, represented as frame type; and the reference index field 345, represented as ref_idx.

The syntax 500 provides two conditions. In a "for" loop, the syntax 500 proceeds from an FOC of 1 to an FOC with a maximum FOC. In an "if" condition, the syntax 500 provides that, if the frame type does not have a value of 0 corresponding to an intra-prediction mode, and thus if the frame type has a value of 1 corresponding to a unidirectional prediction mode or a value of 2 corresponding to a bidirectional prediction mode, then the reference index indicates what frame to base coding of a current unit on.

Figure 6A:
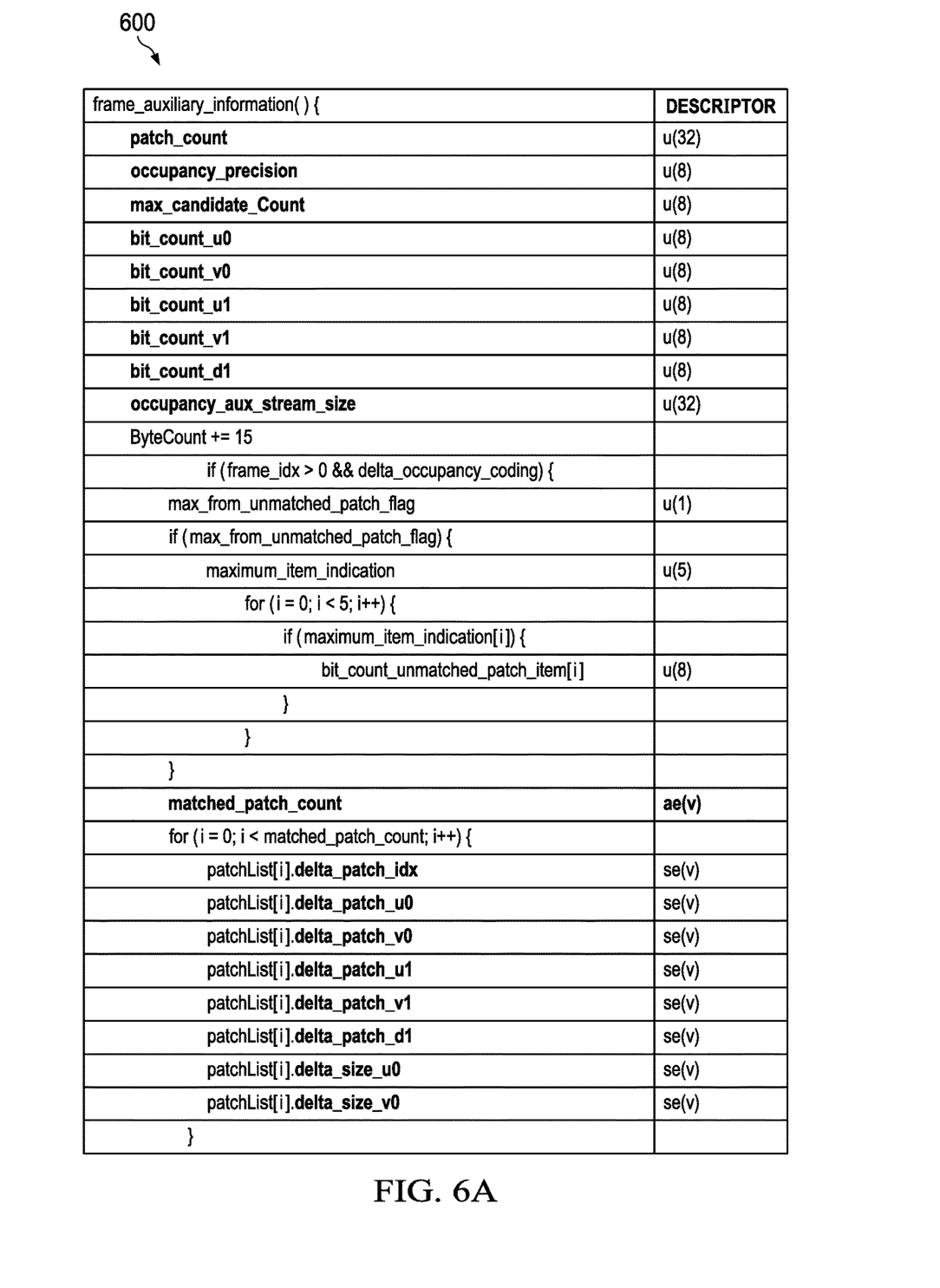
FIG. 6A is a first part of syntax for the frame auxiliary information field in FIG. 3 according to an embodiment of the disclosure.
Figure 6B:
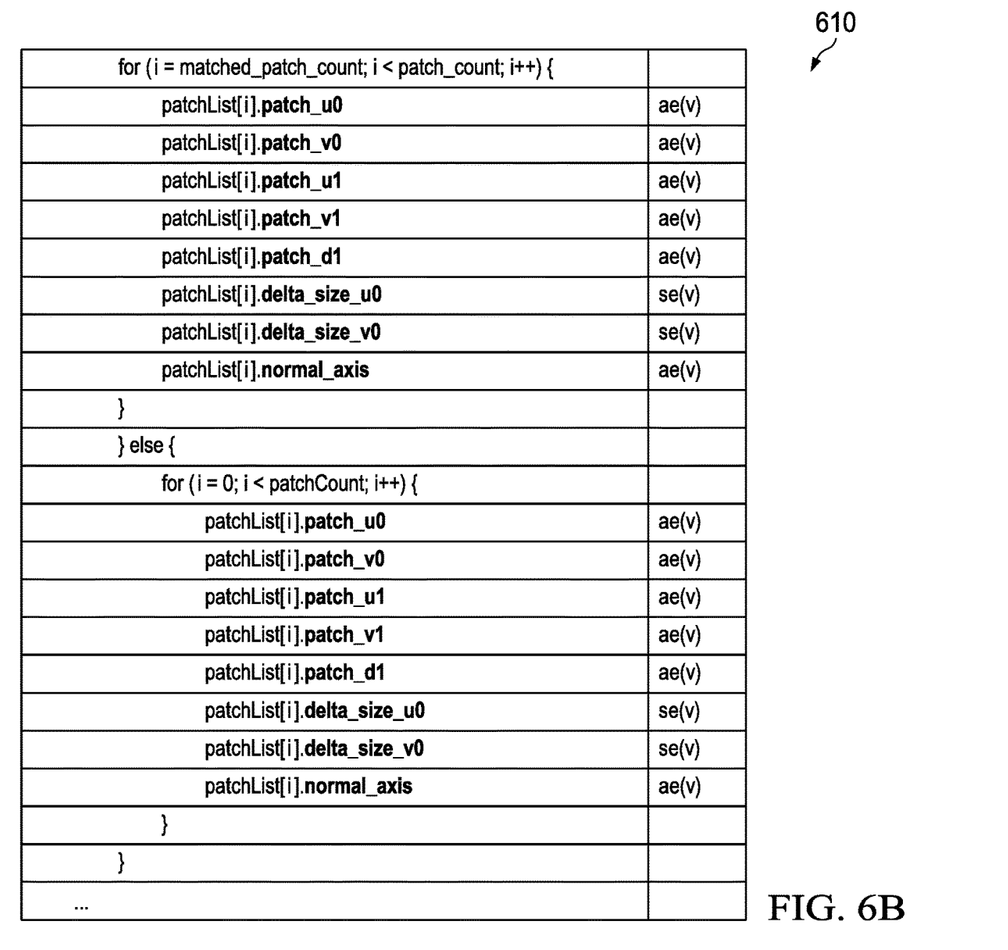
FIG. 6B is a second part of syntax for the frame auxiliary information field in FIG. 3 according to an embodiment of the disclosure.

FIG. 6A is a first part 600 of syntax for the frame auxiliary information field 315 in FIG. 3 according to an embodiment of the disclosure. FIG. 6B is a second part 610 of syntax for the frame auxiliary information field 315 in FIG. 3 according to an embodiment of the disclosure. The encoder 130 and the decoder 180 may store the syntax. The encoder 130 implements the syntax in step 210 of FIG. 2, and the decoder 180 implements the syntax in step 240 of FIG. 2. The syntax shows that the frame auxiliary information field 315, represented as frame_auxiliary_information, comprises a maximum candidate count field, represented as max_candidate_Count. max_candidate_Count specifies a maximum number of frames in a coding sequence. Once the number of frames in a coding sequence is greater than the maximum number, max_candidate_Count restarts at 0. max_candidate_Count corresponds to MaxPatchFrmOrderCntLsb, which is described below.

In a primary "if" condition, maximum_item_indication defines a bit count for a corresponding syntax element to be encoded. matched_patch_count defines a number of inter-coded patches that have a predictor in a corresponding reference frame. In a first "for" loop, the syntax iterates all inter-coded patches, and the syntax either encodes syntax elements in a differential manner in the encoder 130 or decodes corresponding syntax elements in the decoder 180 using delta_patch_idx from the reference index field 345. The encoder 130 iterates and encodes the rest of the patches using intra coding mode.

Returning to FIG. 3, the simplified encoded bitstream 300 implements both prediction type signaling of point clouds and temporal order signaling of point clouds. Specifically, the frame type field 340 implements prediction type signaling, and the maximum FOC field 320, the POC lookup encoder field 325, the maximum FOC field 330, the FOC field 335, and the reference index field 345 implement temporal order signaling. Though the maximum FOC field 320, the POC lookup encoder field 325, the maximum FOC field 330, the FOC field 335, the frame type field 340, and the reference index field 345 are shown in the simplified encoded bitstream 300, those same fields may be implemented in another bitstream, for instance an encoded bitstream that complies with ISO/IEC standards or other standards and therefore provides complete information for PCC.

Figure 7:
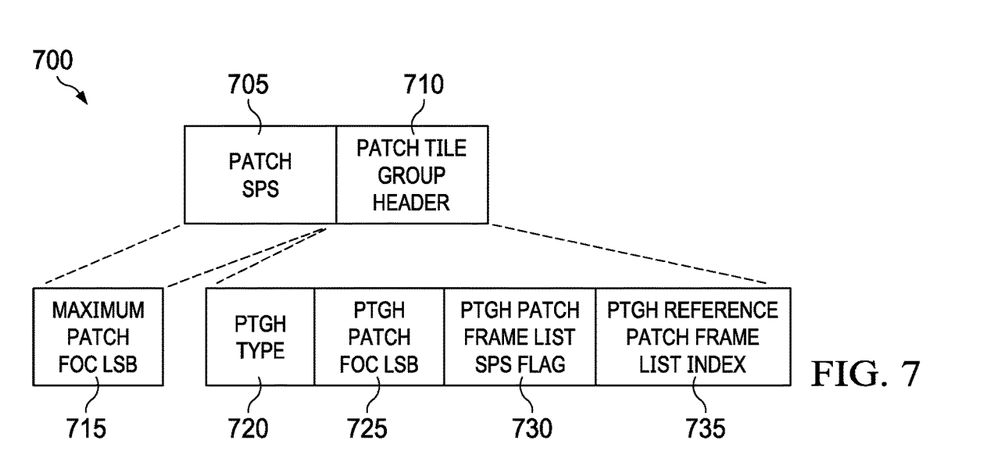
FIG. 7 is a schematic diagram of a simplified encoded bitstream according to another embodiment of the disclosure.

FIG. 7 is a schematic diagram of a simplified encoded bitstream 700 according to another embodiment of the disclosure. The simplified encoded bitstream 700 may be the encoded bitstream in FIG. 2. The simplified encoded bitstream 700 demonstrates part of an encoded bitstream for PCC. Thus, the encoded bitstream may comprise other fields not shown, or the fields may be in a different arrangement. The simplified encoded bitstream 700 comprises a patch SPS field 705 and a patch tile group header field 710.

The patch SPS field 705 comprises a maximum patch FOC LSB field 715. The maximum patch FOC LSB field 715 may be represented as psps_log 2_max_patch_frame_order_cnt_lsb_minus4. The maximum patch FOC LSB field 715 specifies a length of a PTGH patch FOC LSB syntax field.

Figure 8:
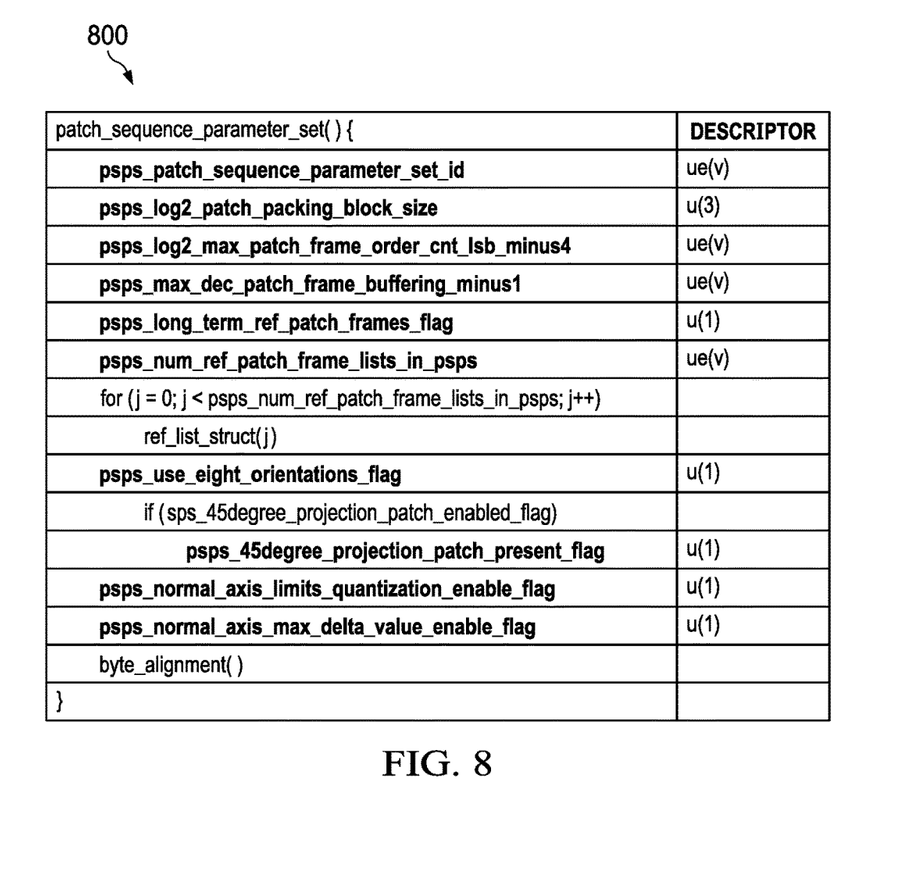
FIG. 8 is syntax for the patch SPS field in FIG. 7 according to an embodiment of the disclosure.

FIG. 8 is syntax 800 for the patch SPS field 705 in FIG. 7 according to an embodiment of the disclosure. The encoder 130 and the decoder 180 may store the syntax 800. The encoder 130 implements the syntax 800 in step 210 of FIG. 2, and the decoder 180 implements the syntax 800 in step 240 of FIG. 2. The syntax 800 shows that the patch SPS field 705, represented as patch sequence_parameter_set, comprises the maximum patch FOC LSB field 715, represented as psps_log 2_max_patch_frame_order_cnt_lsb_minus4.

Returning to FIG. 7, the patch tile group header field 710 may be represented as patch_tile_group_header. The patch tile group header field 710 comprises a PTGH type field 720, a PTGH patch FOC LSB field 725, a PTGH patch frame list SPS flag field 730, and a PTGH reference patch frame list index field 735. The PTGH type field 720 may be represented as ptgh_type. The PTGH type field 720 specifies a coding type of a current patch tile group according to Table 2.

TABLE 2

Values for PTGH Type Field 720

| ptgh_type | Name of ptgh_type |
| --- | --- |
| 0 | P (P patch tile group) |
| 1 | I (I patch tile group) |

As shown, when ptgh_type has a value of 0, a unidirectional prediction mode denoted by P is used, and when ptgh_type has a value of 1, an intra-prediction mode denoted by I is used. The PTGH patch FOC LSB field 725 may be represented as ptgh_patch_frm_order_cnt_lsb. The PTGH patch FOC LSB field 725 specifies a patch FOC modulo MaxPatchFrmOrderCntLsb for a current patch tile group. A length of the ptgh_patch_frm_order_cnt_lsb syntax element is equal to psps_log 2_max_patch_frame_order_cnt_lsb_minus4+4 bits. A value of ptgh_patch_frm_order_cnt_lsb shall be in the range of 0 to MaxPatchFrmOrderCntLsb−1, inclusive. When ptgh_patch_frm_order_cnt_lsb is not present, it shall be inferred to be equal to 0. The PTGH patch frame list SPS flag field 730 may be represented as ptgh_ref_patch_frame_list_sps_flag. The PTGH patch frame list SPS flag field 730 affects the PTGH reference patch frame list index field 735 as described below. The PTGH reference patch frame list index field 735 may be represented as ptgh_ref_patch_frame_list_idx. The PTGH reference patch frame list index field 735 specifies an index, into a list of ref_list_struct(rlsIdx) syntax structures included in an active PSPS, of a ref_list_struct(rlsIdx) syntax structure that is used for derivation of a reference patch frame list for a current patch tile group. The syntax element ptgh_ref_patch_frame_list_idx is represented by Ceil(Log 2(psps_num_ref_patch_frame_lists_in_psps)) bits. When not present, the value of ptgh_ref_patch_frame_list_idx is inferred to be equal to 0. The value of ptgh_ref_patch_frame_list_idx shall be in the range of 0 to psps_num_ref_patch_frame_lists_in_psps−1, inclusive. When ptgh_ref_patch_frame_list_sps_flag is equal to 1 and psps_num_ref_patch_frame_lists_in_psps is equal to 1, the value of ptgh_ref_patch_frame_list_idx is inferred to be equal to 0. The variable RlsIdx for the current patch tile group is derived as follows:

RlsIdx=psps_num_ref_patch_frame_lists_in_psps?
 ptgh_ref_patch_frame_list_idx: psps_num_ref_patch_frame_lists_in_psps.

Figure 9A:
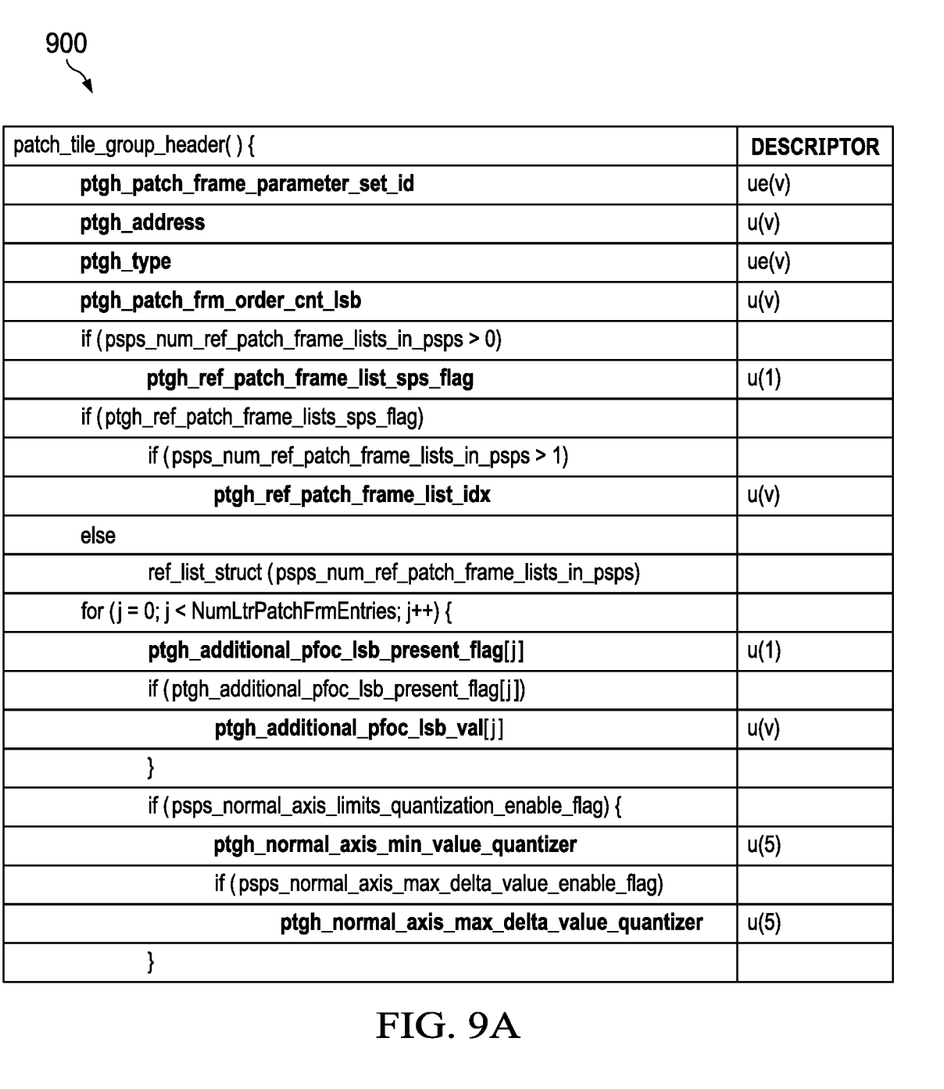
FIG. 9A is a first part of syntax for the patch tile group header in FIG. 7 according to an embodiment of the disclosure.
Figure 9B:
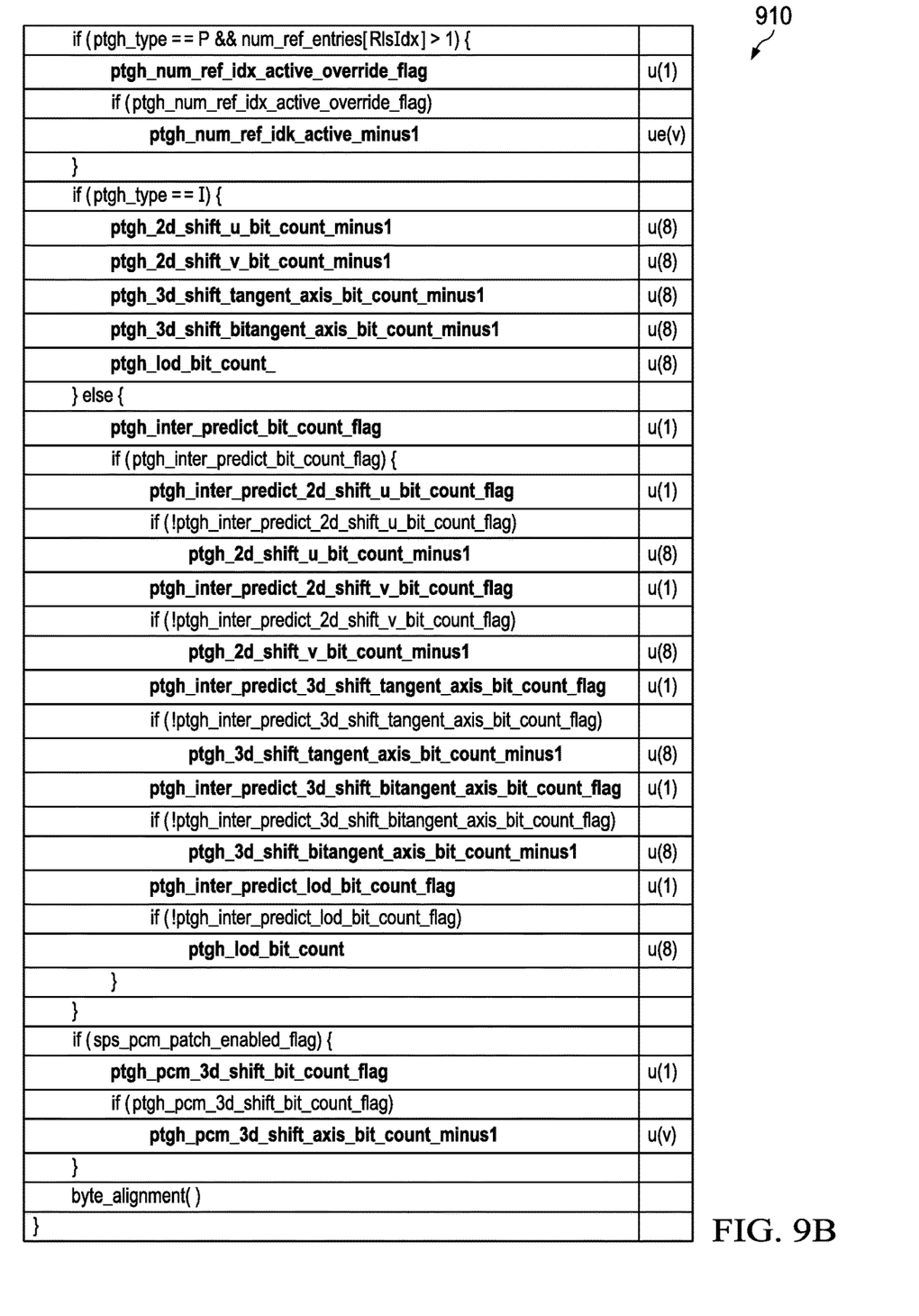
FIG. 9B is a second part of syntax for the patch tile group header in FIG. 7 according to an embodiment of the disclosure.

FIG. 9A is a first part 900 of syntax for the patch tile group header field 710 in FIG. 7 according to an embodiment of the disclosure. FIG. 9B is a second part 910 of syntax for the patch tile group header field 710 in FIG. 7 according to an embodiment of the disclosure. The encoder 130 and the decoder 180 may store the syntax. The encoder 130 implements the syntax in step 210 of FIG. 2, and the decoder 180 implements the syntax in step 240 of FIG. 2. The syntax shows that the patch tile group header field 710, represented as patch_tile_group_header, comprises the PTGH type field 720, represented as ptgh_type; the PTGH patch FOC LSB field 725, represented as ptgh_patch_frm_order_cnt_lsb; the PTGH patch frame list SPS flag field 730, represented as ptgh_ref_patch_frame_list_sps_flag; and the PTGH reference patch frame list index field 735, represented as ptgh_ref_patch_frame_list_idx.

The syntax provides five relevant conditions. In a first "if" condition, the syntax provides that, if the PTGH patch FOC LSB field 725 is present, then code the PTGH patch frame list SPS flag field 730. In a second "if" condition and a third "if" condition, the syntax provides that, if the PTGH patch frame list SPS flag field 730 is present and if a field represented as psps_num_ref_patch_frame_lists_in_psps is greater than 1, then code the PTGH reference patch frame list index field 735. In a fourth "if" condition, the syntax provides that, if the PTGH type field 720 is equal to P and if a field represented as num_ref_entries[RlsIdx] is greater than 1, then both code a field represented as ptgh_num_ref_idx_active_override_flag and, if that field is present, then code a field represented as ptgh_num_ref_idx_active_minus1. P represents a unidirectional prediction mode. In a fifth "if" condition, the syntax provides that, if the PTGH type field 720 is equal to 1, then code five fields as shown.

Returning to FIG. 7, the simplified encoded bitstream 700 implements both prediction type signaling of point clouds and temporal order signaling of point clouds. Specifically, the PTGH type field 720 implements prediction type signaling, and the maximum patch FOC LSB field 715, the PTGH patch FOC LSB field 725, the PTGH patch frame list SPS flag field 730, and the PTGH reference patch frame list index field 735 implement temporal order signaling. Though the maximum patch FOC LSB field 715, the PTGH type field 720, the PTGH patch FOC LSB field 725, the PTGH patch frame list SPS flag field 730, and the PTGH reference patch frame list index field 735 are shown in the simplified encoded bitstream 700, those same fields may be implemented in another bitstream, for instance an encoded bitstream that complies with ISO/IEC standards or other standards and therefore provides complete information for PCC.

Figure 10:
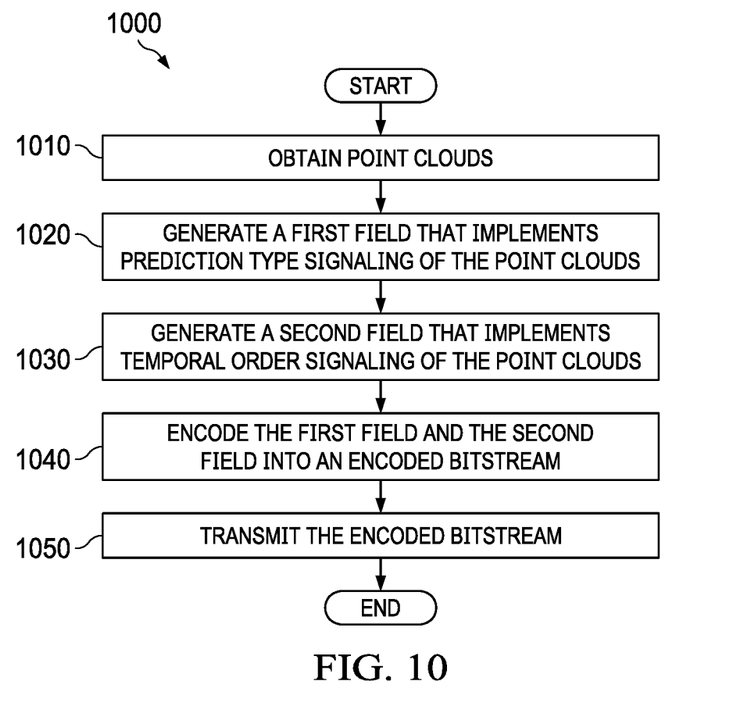
FIG. 10 is a flowchart illustrating a method of encoding a bitstream according to an embodiment of the disclosure.

FIG. 10 is a flowchart illustrating a method 1000 of encoding a bitstream according to an embodiment of the disclosure. The source device 110 implements the method 1000. At step 1010, point clouds are obtained. For instance, the point cloud generator 120 generates the point clouds, and the encoder 130 receives the point clouds from the point cloud generator 120. At step 1020, a first field that implements prediction type signaling of the point clouds is generated. For instance, the first field is the frame type field 340 in FIG. 3. At step 1030, a second field that implements temporal order signaling of the point clouds is generated. For instance, the second field is the maximum FOC field 320, the POC lookup encoder field 325, the maximum FOC field 330, the FOC field 335, or the reference index field 345. At step 1040, the first field and the second field are encoded into an encoded bitstream. Finally, at step 1050, the encoded bitstream is transmitted. For instance, the output interface 140 transmits the bitstream to the input interface 170 of the destination device 160 and through the medium 150.

Figure 11:
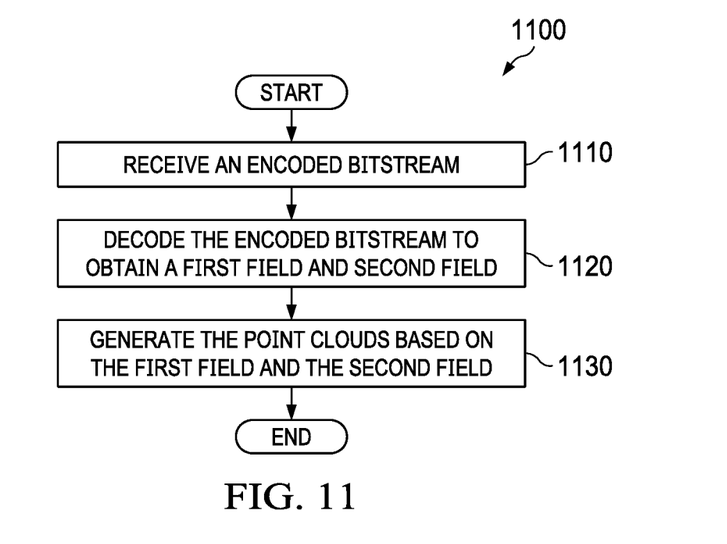
FIG. 11 is a flowchart illustrating a method of decoding an encoded bitstream according to an embodiment of the disclosure.

FIG. 11 is a flowchart illustrating a method 1100 of decoding an encoded bitstream according to an embodiment of the disclosure. The destination device 160 implements the method 1100. At step 1110, an encoded bitstream is received. For instance, the input interface 170 receives the encoded bitstream from the output interface 140 of the source device 110 and through the medium 150. At step 1120, the encoded bitstream is decoded to obtain a first field and a second field. The first field implements prediction type signaling of point clouds. The second field implements temporal order signaling of the point clouds. For instance, the first field is the frame type field 340 in FIG. 3, and the second field is the maximum FOC field 320, the POC lookup encoder field 325, the maximum FOC field 330, the FOC field 335, or the reference index field 345. Finally, at step 1130, the point clouds are generated based on the first field and the second field.

Figure 12:
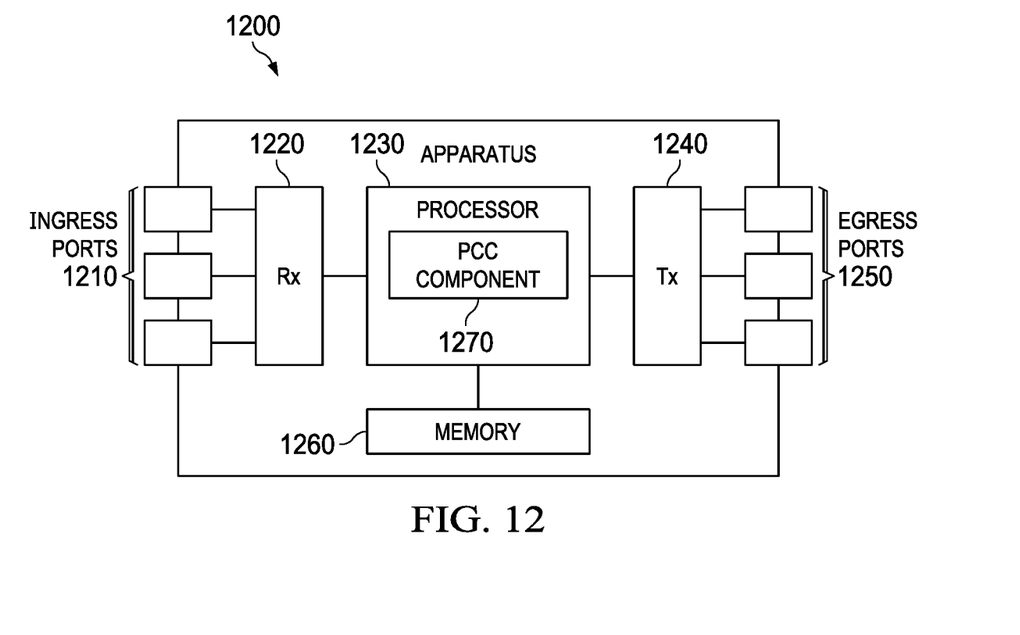
FIG. 12 is a schematic diagram of an apparatus according to an embodiment of the disclosure.

FIG. 12 is a schematic diagram of an apparatus 1200 according to an embodiment of the disclosure. The apparatus 1200 may implement the disclosed embodiments. The apparatus 1200 comprises ingress ports 1210 and an RX 1220 to receive data; a processor, logic unit, baseband unit, or CPU 1230 to process the data; a TX 1240 and egress ports 1250 to transmit the data; and a memory 1260 to store the data. The apparatus 1200 may also comprise OE components, EO components, or RF components coupled to the ingress ports 1210, the RX 1220, the TX 1240, and the egress ports 1250 to provide ingress or egress of optical signals, electrical signals, or RF signals.

The processor 1230 is any combination of hardware, middleware, firmware, or software. The processor 1230 comprises any combination of one or more CPU chips, cores, FPGAs, ASICs, or DSPs. The processor 1230 communicates with the ingress ports 1210, the RX 1220, the TX 1240, the egress ports 1250, and the memory 1260. The processor 1230 comprises a PCC component 1270, which implements the disclosed embodiments. The inclusion of the PCC component 1270 therefore provides a substantial improvement to the functionality of the apparatus 1200 and effects a transformation of the apparatus 1200 to a different state. Alternatively, the memory 1260 stores the PCC component 1270 as instructions, and the processor 1230 executes those instructions.

The memory 1260 comprises any combination of disks, tape drives, or solid-state drives. The apparatus 1200 may use the memory 1260 as an over-flow data storage device to store programs when the apparatus 1200 selects those programs for execution and to store instructions and data that the apparatus 1200 reads during execution of those programs, for instance as a computer program product. The memory 1260 may be volatile or non-volatile and may be any combination of ROM, RAM, TCAM, or SRAM.

A computer program product may comprise computer-executable instructions stored on a non-transitory medium, for instance the memory 1260, that when executed by a processor, for instance the processor 1230, cause an apparatus to perform any of the embodiments.

Figure 13:
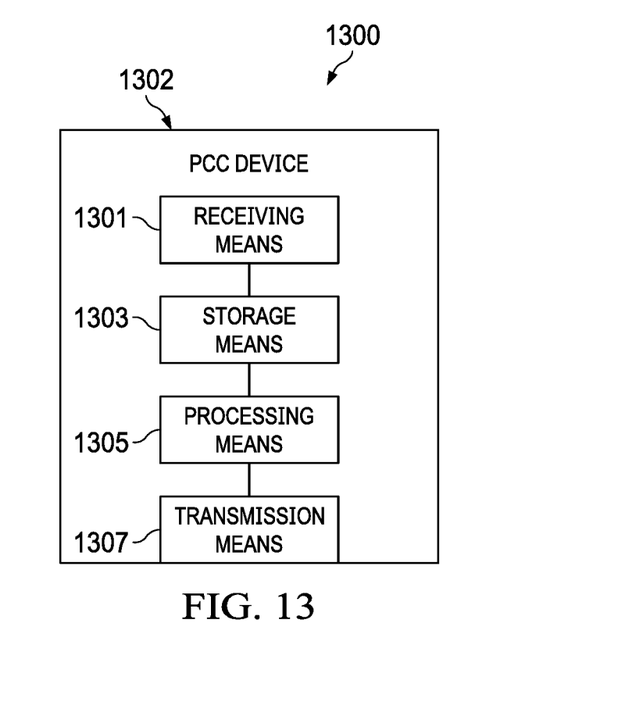
FIG. 13 is a schematic diagram of a means for coding.

FIG. 13 is a schematic diagram of a means for coding 1300. In an embodiment, the means for coding 1300 is implemented in a PCC device 1302 (e.g., the encoder 130 or the decoder 180). The PCC device 1302 includes a receiving means 1301. The receiving means 1301 is configured to receive a picture to encode or to receive a bitstream to decode. The PCC device 1302 includes a transmission means 1307 coupled to the receiving means 1301. The transmission means 1307 is configured to transmit the bitstream to a decoder or to transmit a decoded image to a display means.

The PCC device 1302 includes a storage means 1303. The storage means 1303 is coupled to at least one of the receiving means 1301 or the transmission means 1307. The storage means 1303 is configured to store instructions. The PCC device 1302 also includes processing means 1305. The processing means 1305 is coupled to the storage means 1303. The processing means 1305 is configured to execute the instructions stored in the storage means 1303 to perform the methods disclosed herein. The processing means 1305 may implement an encoding means or a decoding means.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a point cloud compression (PCC) decoder and comprising:
   receiving, by the PCC decoder, a point cloud bitstream comprising a first syntax element and a second syntax element, wherein the first syntax element implements prediction type signaling of point clouds, wherein the second syntax element implements temporal order signaling of the point clouds, wherein the second syntax element is a frame order count field, and wherein the frame order count field is distinct from a picture order count field; and
   decoding, using the first syntax element and the second syntax element, the point cloud bitstream to obtain a decoded point cloud bitstream.

2. The method of claim 1, wherein the first syntax element indicates a coding mode.

3. The method of claim 2, wherein the coding mode comprises an intra-prediction mode.

4. The method of claim 2, wherein the first syntax element is frame_type.

5. The method of claim 2, wherein the coding mode comprises a unidirectional prediction mode.

6. The method of claim 1, wherein the frame order count field shall be in a range of a first value to a second value.

7. The method of claim 6, wherein the first value is 0.

8. The method of claim 7, wherein the second value is a maximum frame order count−1.

9. The method of claim 1, wherein the second syntax element is frame_order_cnt.

10. The method of claim 1, wherein the point cloud bitstream further comprises a reference index that specifies an index.

11. The method of claim 10, wherein the reference index is ref_idx.

12. A point cloud compression (PCC) decoder comprising:
   a receiver configured to receive a point cloud bitstream comprising a first syntax element and a second syntax element, wherein the first syntax element implements prediction type signaling of point clouds, wherein the second syntax element implements temporal order signaling of the point clouds, wherein the second syntax element is a frame order count field, and wherein the frame order count field is distinct from a picture order count field; and
   a processor coupled to the receiver and configured to decode, using the first syntax element and the second syntax element, the point cloud bitstream to obtain a decoded point cloud bitstream.

13. The PCC decoder of claim 12, wherein the first syntax element indicates a coding mode.

14. The PCC decoder of claim 13, wherein the coding mode comprises an intra-prediction mode.

15. The PCC decoder of claim 13, wherein the coding mode comprises a unidirectional prediction mode.

16. The PCC decoder of claim 12, wherein the frame order count field shall be in a range of 0 to a maximum frame order count−1.

17. A method implemented by a point cloud compression (PCC) encoder and comprising:
- obtaining, by the PCC encoder, point clouds;
- generating a first syntax element that implements prediction type signaling of the point clouds;
- generating a second syntax element that implements temporal order signaling of the point clouds, wherein the second syntax element is a frame order count field, and wherein the frame order count field is distinct from a picture order count field;
- encoding the first syntax element and the second syntax element into a point cloud bitstream; and
- storing the point cloud bitstream for communication toward a PCC decoder.

18. The method of claim 17, wherein the first syntax element indicates a coding mode.

19. The method of claim 18, wherein the coding mode comprises an intra-prediction mode.

20. The method of claim 17, wherein the frame order count field shall be in a range of 0 to a maximum frame order count−1.

21. The method of claim 17, further comprising sending the point cloud bitstream to the PCC decoder.

22. The method of claim 19, wherein the coding mode comprises a unidirectional prediction mode.

23. The method of claim 22, wherein the unidirectional prediction mode is a type of prediction that uses only a previous point cloud to code a current point cloud.

24. The method of claim 5, wherein the unidirectional prediction mode is a type of prediction that uses only a previous point cloud to code a current point cloud.

25. The PCC decoder of claim 15, wherein the unidirectional prediction mode is a type of prediction that uses only a previous point cloud to code a current point cloud.

26. The method of claim 1, wherein the point clouds comprise a first point cloud, and wherein the frame order count field uniquely identifies the first point cloud from among the point clouds.

27. The method of claim 1, wherein the point clouds comprise a first point cloud, and wherein the frame order count field indicates a temporal position of the first point cloud relative to the point clouds.

* * * * *

UNITED STATES PATENT AND TRADEMARK OFFICE
CERTIFICATE OF CORRECTION

PATENT NO. : 11,398,058 B2
APPLICATION NO. : 17/146234
DATED : July 26, 2022
INVENTOR(S) : Vladyslav Zakharchenko et al.

It is certified that error appears in the above-identified patent and that said Letters Patent is hereby corrected as shown below:

On the Title Page

Item (72) Delete "Vladyslav Zakharchenko, Sunnyvale, CA (US); Ye-Kui Wang, San Diego, CA (US); Jianle Chen, San Diego, CA (US); Dejung Zhang, Beijing (CN)" and insert -- Vladyslav Zakharchenko, Sunnyvale, CA (US); Ye-Kui Wang, San Diego, CA (US); Jianle Chen, San Diego, CA (US); Dejun Zhang, Beijing (CN) --

Signed and Sealed this
Twenty-first Day of March, 2023

Katherine Kelly Vidal
*Director of the United States Patent and Trademark Office*